Sept. 19, 1961 G. P. STURGIS 3,000,472
FORCED AIR COOLED BRAKES
Filed April 24, 1959 2 Sheets-Sheet 1

Gerald P. Sturgis
INVENTOR.

BY *Clarence A. O'Brien*
*and Harvey B. Jacobson*
Attorneys

Sept. 19, 1961  G. P. STURGIS  3,000,472
FORCED AIR COOLED BRAKES
Filed April 24, 1959  2 Sheets-Sheet 2

Gerald P. Sturgis
INVENTOR

United States Patent Office 3,000,472
Patented Sept. 19, 1961

1

3,000,472
FORCED AIR COOLED BRAKES
Gerald P. Sturgis, 416 W. 11th St., The Dalles, Oreg.
Filed Apr. 24, 1959, Ser. No. 808,597
7 Claims. (Cl. 188—264)

This invention relates to improvements in friction brakes and has special application in connection with the brakes of motor vehicles of all types.

An object of the invention is to provide new and useful improvements in the brake drums and brake shoes of a brake unit, by means of circulating air over surfaces of the shoes and drum and by enabling the flow of air to be moved in such a manner as to withdraw heat from those parts of the brake unit which ordinarily fail due to excessive heat, namely the shoes and drums.

Another object of the invention is to provide a new braking system wherein the brake drum has a spiral groove in the surface thereof with the portions of the drum between the grooved areas being crowned. As the shoes contact the crowned surfaces of the drum, since the grooves and consequently the crown surfaces are arranged in a spiral, surfaces of the drum are swept across the shoes as well as longitudinally of the shoes providing new and different points of contact between the shoes and drum as the shoes are applied against the surface of the drum. A far more uniform wearing action results.

Another object of the invention is to provide means by which to withdraw some of the hot air and the dust, dirt and other foreign matter which collects in the drum by suction. In this way the braking unit may be made completely sealed or essentially completely sealed to exclude most of the foreign matter, moisture, etc. which has a deleterious effect on not only the brake drum and shoes but also all other parts in the brake unit. Most important, however, is the exclusion of a considerable amount of moisture which has the effect of producing irregularity in brake operation.

Another object of the invention is to provide a combination brake drum and brake shoe unit wherein the shoes are used not only for braking purposes but also for administering air under pressure to a spiral groove within the brake drum to circulate in the groove as the brakes are applied by bringing the brake shoes into contact with the surface of the brake drum between grooves.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
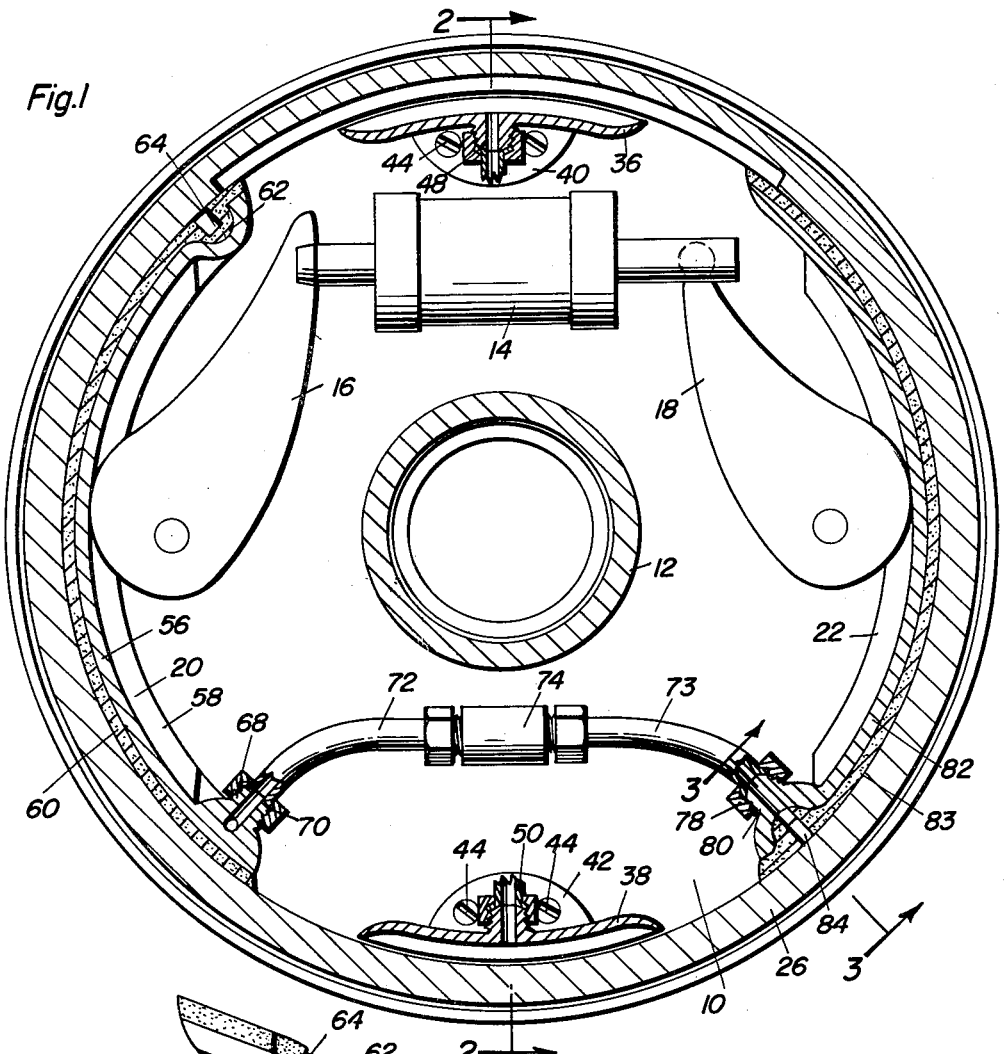
FIGURE 1 is a sectional view of a unit constructed in accordance with the invention.

In the accompanying drawings there are some parts which are conventional. Among these are back plate 10, hub 12, hydraulic brake cylinder 14 and pressure cams 16 and 18. The hydraulic cylinder 14 may, of course, be varied and the same is especially true in connection with the pressure cams 16 and 18. These may be substituted by other means to actuate the brake shoes 20 and 22.

The invention provides improvements in the brake drum 26 and in the brake shoes 20 and 22 which coact with the brake drum. The same holds true for the means for extracting hot air and foreign matter from chamber 28 enclosed between back plate 10, brake drum 26 and a cover plate 30 whose edges may be sprung into groove 32 which is circumferentially arranged in a small flange 34 at one edge of the brake drum 26. An upper and lower suction cup 36 and 38 respectively is attached, for instance by flanges 40 and 42 together with bolts 44, to the back plate 10. The suction cups open toward the inner surface of the brake drum 26. Suction line fittings 48 and 50 are attached to the suction cups and are adapted to draw hot air, dust and other foreign matter from the chamber 28. It is especially important to draw out the hot air so that there will be a good circulation of cooling air under pressure to the confronting surfaces of the shoes and drum.

Figure 5:
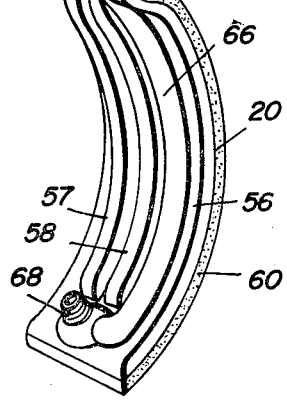
FIGURE 5 is a perspective view of one of the brake shoes.
Figure 6:
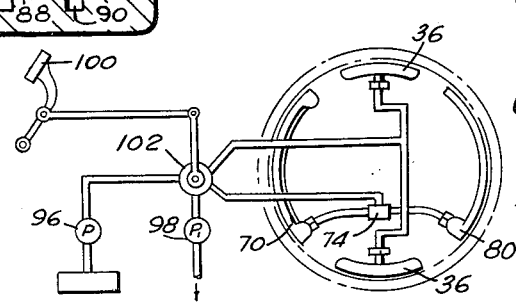
FIGURE 6 is a diagrammatic view of a fluid control system applicable to the brake unit of the present invention.

Brake shoe 20 (FIGURE 5) is constructed of a curved plate 56 having a pair of spaced ribs 57 and 58 between which pressure cam 16 is operable. The ribs are on one surface of the curved plate, and there is a lining 60 bonded or otherwise secured to the opposite surface of the curved plate 56. One end of the lining has a thickened part 62 in which there is a transverse air conducting channel 64 (FIGURE 1). This channel being in registry with an air conductor, for instance line 66 which is on the rear surface of plate 56. Line 66 has a nipple 68 registered with one end thereof, the nipple being attached to or formed as a part of plate 56. A fitting 70 is attached to the nipple 68 (FIGURE 1) and attached to an air line 72. The air line has a T-fitting 74 between its ends, with the T-fitting adapted to be connected to a source of air under pressure as seen in FIGURE 6. The air source may be a pump 96, and the source of suction may also be a suction pump 98 or a vacuum connection with the manifold of the motor vehicle. In the latter instance, there must be means provided to exclude the dirt from entering the manifold of the vehicle. The sources of pressure and suction are operated in unison with actuation of the brake pedal 100 in the motor vehicle, for example, by installing a valve 102 to be controlled by brake pedal operation as illustrated in FIGURE 6.

Brake shoe 22 functions in the same way as brake shoe 20 but is made slightly different so that the application of air under pressure on the drum 26 inner surface is at diametrically opposed places. Accordingly, line 72 has a branch 73 which is connected with T-fitting 74 and which is connected by nut 78 to a nipple 80 on the plate 82 of brake shoe 22. The nipple 80 is in registry with a transverse channel 84 in plate 82 and its brake lining 83 which is similar to lining 60. Channel 84 opens in a direction facing the inner surface of the brake drum 26. It is now evident that both shoe channels 64 and 84 are simultaneously supplied with air under pressure from line 72.

Attention is now invited to the brake drum 26. It has a braking surface 88 provided with a spiral groove 90 commencing from the inner edge 91 of the brake drum to the outer edge 92 thereof. The central axis of the spiral is coincident with the axis of rotation of the brake drum. The portions 94 of the braking surface between the grooved areas are transversely crowned to prevent biting and subsequent destruction of the brake linings. Further, by having the areas of the drum between the grooves crowned a more effective braking contact is achieved when the brake shoes are pressed against the brake surface. The entire drum may be blued to prevent rust, this being especially important in the grooves which are not swept by the brake lining but which function as air conductors when air under pressure is applied into the groove 90 at the air inlet ports made by channels 64 and 84.

Figure 3:
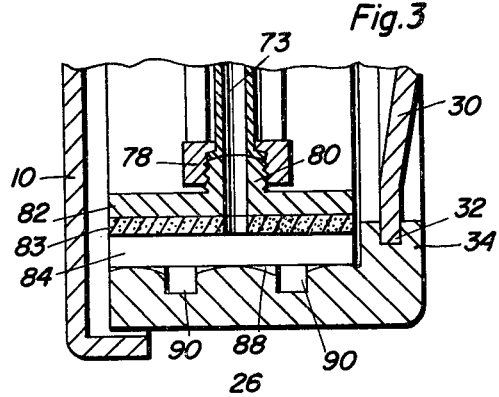
FIGURE 3 is an enlarged fragmentary sectional view taken on the line 3—3 of FIGURE 1.
Figure 2:
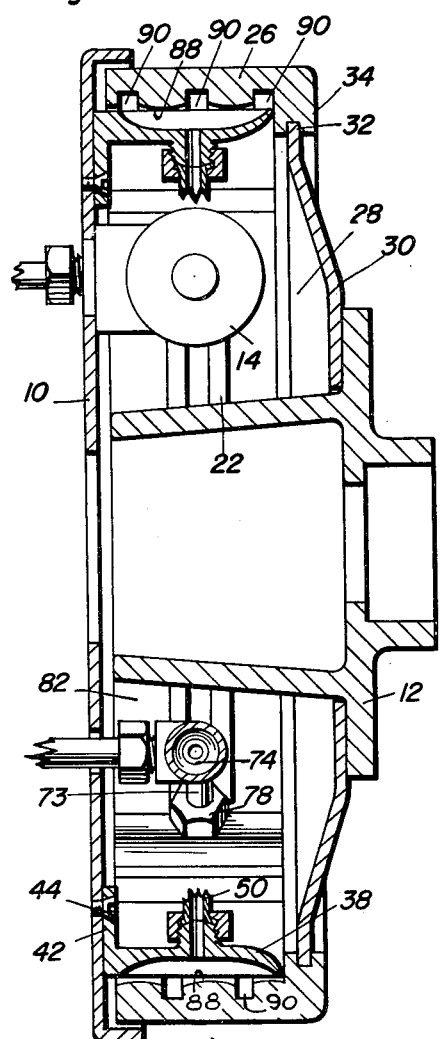
FIGURE 2 is a sectional view taken on the line 2—2 of FIGURE 1.
Figure 4:
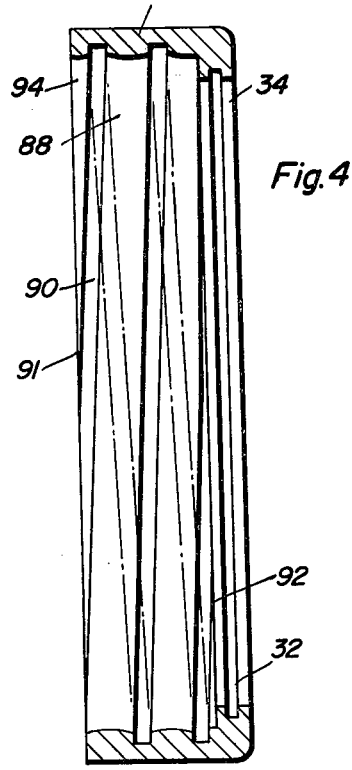
FIGURE 4 is a sectional view of the brake drum.

As the brake shoes are pressed against the brake drum braking surface the crowned surfaces of the drum continually change with reference to the brake shoe linings due to the spiral arrangement thereof. Further, the air under pressure applied into the grooves continually sweeps down the grooves and over portions of the crowned braking surfaces immediatey adjacent to the grooves (see FIGURE 3) for obtaining the desired high cooling effect.

Not only is the brake lining more uniformly worn by practice of the invention, but also it will last longer due to the retention of the operating temperatures at a comparatively low level and also, the brakes when installed on the motor vehicle will not fade or fail to hold as they do at the present time when they are subjected to heavy loading conditions, for example panic stops at high speeds. This is so because it has been found that the chief cause of brake failure at high speeds is due to the generation of intense heat and the inability of conventional brakes and brake units to dissipate the heat fast enough.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a brake unit, the combination of a brake drum having a braking surface provided with a spiral groove with brake surface area between the portions of the groove, brake shoes operative to engage said surfaces and when in contact therewith continually being swept by said surfaces to present new and transversely progressive changing areas of said surfaces to the shoes, and passage means for introducing air under pressure from a source into said groove through said brake shoes at diametrically opposite points on said brake drum to cool the drum and shoes, and means subjected to a source of vacuum for withdrawing the heated air from said groove, said means for withdrawing heated air including at least one suction cup disposed between said shoes adjacent to the braking surface within said brake drum.

2. The combination as defined in claim 1, including means responsive to brake pedal actuation for operatively connecting said passage means and suction cup to said source of air pressure and source of vacuum respectively.

3. The combination of claim 1, wherein said passage means includes axially extending channels confronting the braking surfaces and disposed at said diametrically opposite points on the brake shoes, an arcuate air conductor carried by at least one of the brake shoes in communication with the channel thereon, and a supply conduit connected to said air conductor on said one brake shoe and the channel on an adjacent end of another brake shoe for simultaneous supply of air under pressure to said brake shoes.

4. The combination of claim 3, including means responsive to brake pedal actuation for operatively connecting said passage means and suction cup to said source of air pressure and source of vacuum respectively.

5. In a brake unit, the combination of a brake drum having a braking surface provided with a spiral groove with brake surface area between the portions of the groove, brake shoes operative to engage said surfaces and when in contact therewith continually being swept by said surfaces to present new and transversely progressive changing areas of said surfaces to the shoes, and passage means for introducing coolant under presure into said groove through said brake shoes at diametrically opposite points of said brake drum to cool the drum and shoes, and means subjected to some source of vacuum for withdrawing the heated coolant from said groove, said means for withdrawing heated coolant including at least one suction cup disposed between said shoes adjacent to the braking surface within said brake drum.

6. In a brake unit, the combination of a brake drum having grooved brake surfaces, brake shoe means engageable with said brake surfaces, a source of coolant under pressure, means mounted in said brake drum and operatively connected to the brake shoe means for introducing coolant from the source into the grooved brake surfaces through said brake shoe means, and suction means operatively connected to a source of vacuum and disposed in adjacent confronting relation to the brake surfaces between the brake shoe means for withdrawing heated coolant therefrom.

7. The combination of claim 6, wherein said means operatively connected to the vacuum source includes arcuate cup means mounted within the brake drums and extending along an arcuate portion of the brake surfaces between the brake shoe means.

References Cited in the file of this patent

UNITED STATES PATENTS

| | | |
|---|---|---|
| 1,715,806 | Wersall | June 4, 1929 |
| 1,919,343 | Payne | July 25, 1933 |
| 1,956,855 | Colgren | May 1, 1934 |
| 1,974,905 | Walker | Sept. 25, 1934 |
| 2,042,750 | Van Halteren | June 2, 1936 |
| 2,091,865 | Leveen | Aug. 31, 1937 |
| 2,102,855 | Rosner | Dec. 21, 1937 |
| 2,105,323 | Hunt | Jan. 11, 1938 |
| 2,647,592 | Tilden | Aug. 4, 1953 |
| 2,851,132 | James | Sept. 9, 1958 |
| 2,966,241 | Martin | Dec. 27, 1960 |

FOREIGN PATENTS

| | | |
|---|---|---|
| 537,069 | Germany | Oct. 30, 1931 |
| 272,795 | Italy | Mar. 21, 1930 |